United States Patent [19]
Moore et al.

[11] Patent Number: 5,882,036
[45] Date of Patent: Mar. 16, 1999

[54] HYBRID INFLATOR WITH REDUCED SOLID EMISSIONS

[75] Inventors: Walter A. Moore, Ogden; Robert E. Lewis, Roy; Marcus T. Clark, Kaysville, all of Utah; Bryan D. Matzl, Valrico, Fla.

[73] Assignee: Autoliv ASP, Inc., Ogden, Utah

[21] Appl. No.: 926,916

[22] Filed: Sep. 10, 1997

[51] Int. Cl.⁶ .................................................. B60R 21/26
[52] U.S. Cl. ........................................... 280/736; 280/737
[58] Field of Search ................................ 280/728.1, 736, 280/737, 741, 748

[56] References Cited

U.S. PATENT DOCUMENTS

| | | | |
|---|---|---|---|
| 5,230,531 | 7/1993 | Hamilton et al. | 280/737 |
| 5,351,988 | 10/1994 | Bishop et al. | 280/737 |
| 5,360,232 | 11/1994 | Lowe et al. | 280/741 |
| 5,538,278 | 7/1996 | Blackshire et al. | 280/736 |
| 5,553,889 | 9/1996 | Hamilton et al. | 280/736 |
| 5,709,406 | 1/1998 | Buchanan | 280/737 |

*Primary Examiner*—Ponnathapura Achutamurthy
*Assistant Examiner*—Brett Nelson
*Attorney, Agent, or Firm*—Sally J. Brown

[57] ABSTRACT

A hybrid inflator having a quantity of stored gas in a pressure vessel, and a quantity of gas generant stored within a generant housing having at least one port in its longitudinal end. Within the generant housing the gas generant is retained within a porous sleeve. This sleeve is spaced inward from the non-porous generant housing, such that a free flow area is formed between the sleeve and the generant housing. The inflation gas created by the gas generant will thus flow radially outward through the sleeve, and then be turned to flow longitudinally toward the port(s) in the generant housing. Providing the free flow area reduces the pressure drop across the generant sleeve, resulting in less slag being forced through the sleeve to be entrained within the created gas flow. Additionally, the changes in direction forced upon the created gas flow to exit the generant housing cause additional amounts of slag to be removed from the created gas flow. This results in a hybrid inflator having reduced solid emissions. A second embodiment employs longitudinal flow directly from the gas generant with a free flow area leading to radial ports on the generant housing.

14 Claims, 2 Drawing Sheets

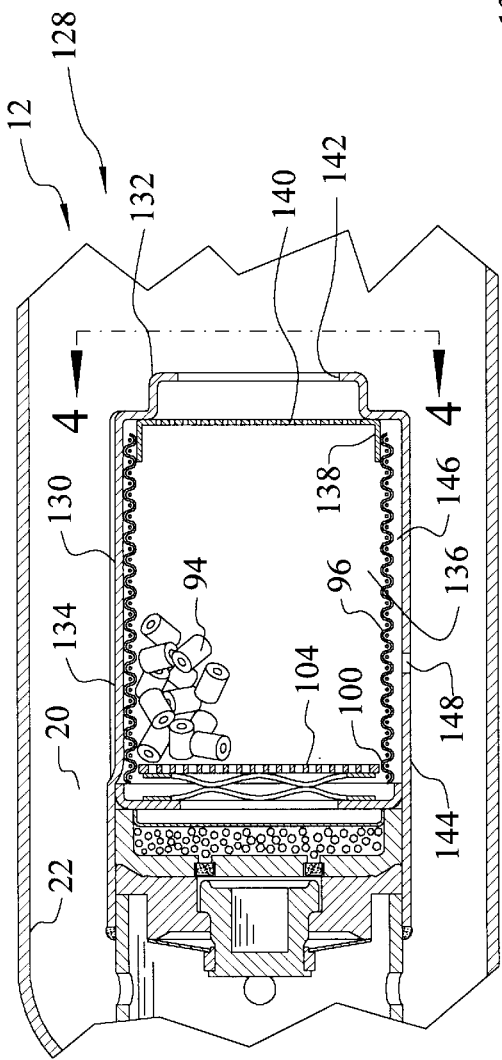
Fig. 3
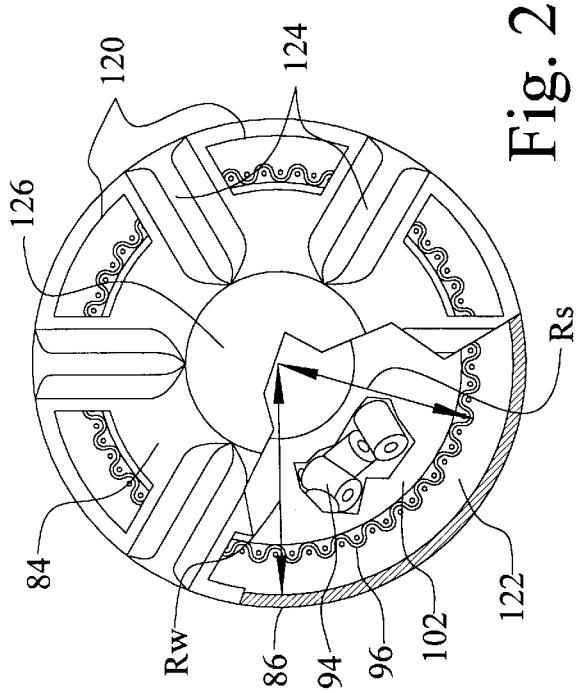
Fig. 4
Fig. 2

HYBRID INFLATOR WITH REDUCED SOLID EMISSIONS

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to inflators for use in airbag restraint systems. In particular, the present invention relates to an improved hybrid inflator having reduced particulates in the generated gas.

Airbag restraint systems for vehicles typically include a collision sensor, a gas generator or inflator operatively connected to the collision sensor, and a cushion which receives the gas generated by the inflator. When the collision sensor detects a collision, it sends a signal which activates the inflator. The inflator then produces or releases a quantity of inflation gas into the cushion. The cushion is inflated by this gas, providing a restraint for the vehicle occupant.

Various types of inflators are known, and are generally grouped according to their operating principles. For example, pyrotechnic inflators include a quantity of solid gas generant material which produces the inflation gas during an energetic reaction (e.g., combustion). Another type of inflator is generally referred to as a hybrid inflator. A hybrid inflator includes a quantity of stored gas under pressure, which is released upon activation by the collision sensor. Releasing stored gas alone, however, results in an initially large pressure output which quickly tapers off, which is not desirable for the inflation of the cushion and protection of the occupant. To avoid this, hybrid inflators also include a quantity of the gas generating pyrotechnic material.

It is well known that heating a gas will increase its pressure. As such, the combustion of the pyrotechnic material in a hybrid inflator will heat the stored gas, increasing its pressure. This permits a smaller quantity of gas to be stored, reducing the size of the pressure vessel holding the stored gas. Additionally, the pyrotechnic material may itself produce gas which will combine with the stored gas to inflate the cushion, further reducing the quantity of stored gas required. A further advantage of using the pyrotechnic material is the possibility of combusting the pyrotechnic material at a delayed time. Specifically, if the pyrotechnic material is fully combusted before the stored gas is released, the pressure of the stored gas will be increased, but the release of this gas will again result in a large initial pressure which quickly tapers off. However, delaying the combustion of the pyrotechnic material until during the release of the stored gas will provide a more sustained pressure, and can even be timed to provide an initially lower pressure which increases smoothly before tapering off gradually. As such, hybrid inflators may provide a very advantageous inflation of the cushion.

These advantages have contributed to the commercial success of a known model of hybrid inflator, similar to that show in FIG. 23 of U.S. Pat. No. 5,230,531 to Hamilton et al., which is included herein by reference. While this inflator has advantages, it also has drawbacks. One of these is the production of particulates by the pyrotechnic material. Specifically, the pyrotechnic material has been a reactive compound (such as potassium perchlorate $KClO_4$) held in the desired solid shape with the use of a plastic (PVC) binder. During combustion of the pyrotechnic material, this pyrotechnic material forms a high percentage of KCl, which forms very fine particles which are entrained within the gas flow from the inflator. These particles are sufficiently small that it has not been possible to filter them from the gas.

While these particles are not believed to be a health hazard, they are sufficiently fine that they create the appearance of smoke. This obviously has a detrimental psychological impact upon the occupant of a vehicle, who may erroneously believe that the vehicle is on fire following the collision.

One solution to this problem is provided in U.S. Pat. No. 5,240,283 to Kishi, which shows a cushion provided with a main volume inflated directly by the inflator, and one or more secondary volumes. These secondary volumes receive the gas forced from the cushion when it is compressed by the body of the vehicle occupant, rather than venting this gas to the vehicle interior. As such, this arrangement does not eliminate the particulates, but seeks to retain them within the cushion. While this could be a solution, use of a porous cushion material (which is often desirable) will still permit some of the particulate to escape the cushion through the fabric itself. Additionally, it is often desirable to alter the airbag performance by altering the venting characteristics from the cushion. This is made more difficult with the use of reservoirs as in the Kishi patent.

Another solution is shown in U.S. Pat. No. 5,602,361 to Baglini et al. This patent shows the use of a different formulation of pyrotechnic gas generant in a hybrid inflator. While this arrangement provides little or no particulate, it suffers from a different drawback. Specifically, the pyrotechnic generant requires reactive gas, such as oxygen, to be mixed with the stored gas. This reactive gas is required for proper combustion of the pyrotechnic generant. If this inflator suffers from a leak, the stored gas (with the reactive gas mixed therein) will not be present if the inflator is later fired. This will cause incomplete combustion of the new formulation pyrotechnic generant, and result in the production of an undesirable level of toxic gas. As such, this arrangement relies heavily upon the operation of a pressure sensor to cancel activation of the inflator in case of a leak. The possibility of creating toxic gases, should the pressure sensor fail, renders this arrangement less desirable.

Avoiding the production of unfilterable particulate while eliminating the possibility of creating toxic gases would greatly improve existing hybrid inflators, and is the subject of the present invention.

SUMMARY OF THE INVENTION

An object of the present invention is to provide a hybrid airbag inflator which provides reliable operation to protect a vehicle occupant.

Another object of the present invention is to provide such an inflator which has a suitable pressure output to inflate the cushion in a manner providing proper inflation of the cushion.

A further object of the present invention is to provide such an inflator which does not produce an appreciable amount of particulate.

Another object of the present invention is to provide an inflator, where the pressure differential near the gas generant during combustion is kept low, such that slag is not entrained within the flow of gas.

Another object of the present invention is to provide an inflator in which the gas generated by the inflator undergoes a tortuous path to assist in removing slag entrained within the gas flow.

These and other objects are achieved by a hybrid inflator having a quantity of stored gas in a pressure vessel, and a quantity of gas generant stored within a generant housing having at least one port in its longitudinal end. Within the generant housing the gas generant is retained within a porous sleeve. This sleeve is spaced inward from the non-porous generant housing, such that a free flow area is formed between the sleeve and the generant housing. The inflation gas created by the gas generant will thus flow radially outward through the sleeve, and then be turned to flow longitudinally toward the port(s) in the generant housing. Providing the free flow area reduces the pressure drop across the generant sleeve, resulting in less slag being forced through the sleeve to be entrained within the created gas flow. Additionally, the changes in direction forced upon the created gas flow to exit the generant housing cause additional amounts of slag to be removed from the created gas flow. This results in a hybrid inflator having reduced solid emissions. A second embodiment employs longitudinal flow directly from the gas generant with a free flow area leading to radial ports on the generant housing.

BRIEF DESCRIPTION OF THE DRAWINGS

The objects and features of the invention noted above are explained in more detail with reference to the drawings, in which like reference numerals denote like elements, and in which:

FIG. 2 is a detail end view along line 2—2 of FIG. 1, with partial cut-away;

FIG. 3 is a detail cross-sectional side view of a second embodiment of the present invention; and FIG. 4 is a detail end view along line 4—4 of FIG. 2, with partial cut-away.

DETAILED DESCRIPTION OF THE INVENTION

Figure 1:
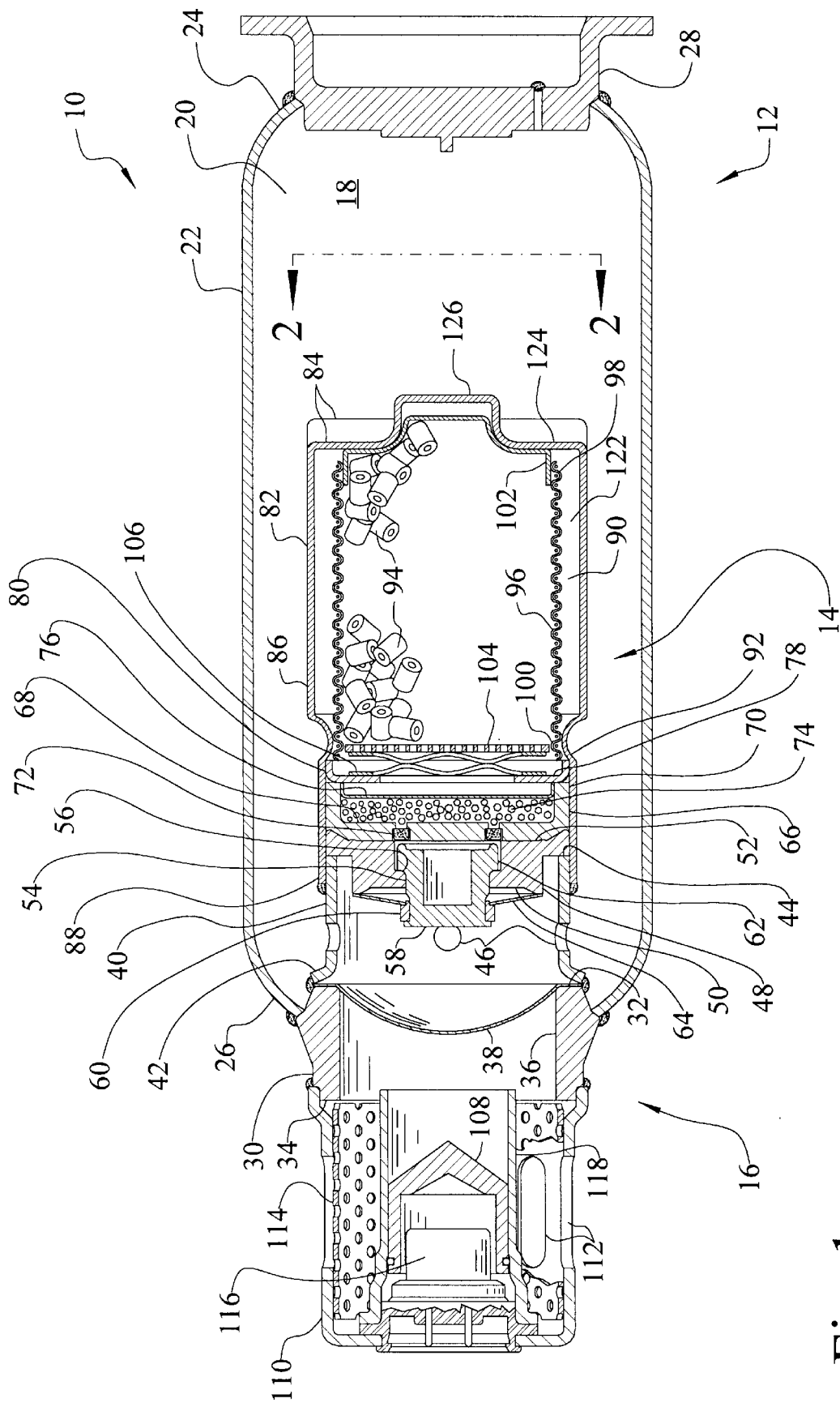
FIG. 1 is a cross-sectional side view of an inflator according to a first embodiment of the present invention.

With reference to FIG. 1, a first embodiment of a hybrid inflator according to the present invention is generally designated by reference numeral 10. The inflator 10 generally includes a pressure vessel 12, a heater assembly 14, and an activator 16 for beginning operation of the heater assembly 14. Each of these items will be described in more detail below.

The pressure vessel 12 serves to hold a quantity of stored inflation gas 18 under pressure. The pressure vessel 12 may be formed as any container having an interior 20 to receive the stored inflation gas 18, and which is sufficiently strong to safely retain the gas under pressure for a period of fifteen to twenty years. In the preferred form shown in FIG. 1, the pressure vessel 12 is formed by a sidewall 22 having a generally cylindrical form with tapered first and second longitudinal ends 24 and 26, respectively. The sidewall thus serves to define a longitudinal axis (not shown) along its center. The first end 24 is secured to an end cap 28, such as by welding or by forming the end cap 28 as a monolithic extension of the sidewall 22. This end cap 28 may include an appropriate fill hole to provide the stored inflation gas 18 to the interior 20. Alternatively, a fill hole may be provided in another component, such as the sidewall 22, or the pressure vessel 12 may include final assembly in an atmosphere of the pressurized gas to be stored.

The second end 26 of sidewall 22 is secured to a mounting collar 30. The mounting collar 30 is annular, with an inner end 32, an outer end 34 and a central opening 36 extending between these ends. The sidewall 22 is preferably secured to the mounting collar 30 at a position intermediate the ends 34 and 36. A burst disc 38 is secured to the mounting collar 30 in a position to block the central opening 36, such as by attachment to the inner end 32. The burst disc 38 thus serves to complete the pressure vessel 12 as a gas-tight unit under normal conditions. As is known in the art, the burst disc 38 is frangible, and may be ruptured to permit the stored inflation gas 18 to exit the interior 20 upon activation of the inflator 10.

The inner end 32 of the mounting collar 30 may also serve to mount a spacer ring 40. The spacer ring 40 is cylindrical, and preferably mounted coaxially with the longitudinal axis of the pressure vessel 12. The spacer ring 40 has first and second longitudinal ends 42 and 44, respectively, with the first longitudinal end 42 secured to the inner end 32 of the mounting collar 30, such as by welding. This welding step may advantageously be used to additionally secure the periphery of the burst disc 38. For reasons made more clear below, the spacer ring 40 includes a plurality of flow ports 46 extending therethrough at angularly spaced locations about its periphery.

The second longitudinal end 44 of the spacer ring 40 abuts against a slide ring 48. The slide ring 48 is an annular member having an outer face 50, an inner face 52, and a slide hole 54 extending between these faces, preferably coaxial with the longitudinal axis of the pressure vessel 12. In the preferred form, the slide hole 54 has a stepped diameter, with a smaller diameter closest to the burst disc 38, to thus form a shoulder 56 facing away from the burst disc 38.

Mounted within the slide hole 54 is a piston 58 having a peripheral shape matching that of the slide hole 54, and sized for a sliding fit. The piston 58 has an enlarged diameter head 60, which may be formed by securing a ring to the end of the piston 58, as shown. The piston 58 also includes an enlarged diameter inner end 62. As may be seen, the enlarged diameter of the inner end 62 will abut against the shoulder 56 of the slide hole 54. In a similar manner, the head 60 will also abut against the outer face 50 of the slide ring 48 when the piston slides to the right in FIG. 1. As such, the piston 58 may slide between an inactive position, shown in FIG. 1, to a striking position, in which the inner end 62 extends slightly beyond the inner face 52 of the slide ring 48.

The piston 58 is initially held in the inactive position by a biasing element, preferably in the form of a dish spring 64. As shown, the outer diameter of the dish spring 64 may abut against the outer face 50 of the slide ring 48, and the inner diameter of the dish spring 64 may be retained under the enlarged head 60 of piston 58. In this manner the dish spring 64 will hold the piston 58 in the inactive position, but will permit the piston to slide to the striking position if a sufficient force is applied to the head 60 of the piston 58.

The inner face 52 of the slide ring 48 abuts against an ignitor cup 66. The ignitor cup 66 is a concave member opening away from the piston 58, and having a circular bottom wall 68 and a peripheral sidewall 70 extending from the bottom wall 68. The sidewall 70 preferably has a diameter equal to that of the largest diameter of slide ring 48. The face of the bottom wall 68 which abuts against the slide ring 48 includes one or more depressions which receive a like number of primers 72. In the preferred embodiment, a single annular primer is employed. The primers 72 are located at positions aligned with the inner end 62 of the piston 58, such that the inner end 62 of the piston 58 will contact, or strike, the primers 72 when the piston 58 is in the striking position. This striking of the primers will produce a small quantity of hot combustion gas.

The depression(s) in the bottom wall 68 of ignitor cup 66 are connected to the interior of the ignitor cup 66 by one or more ports. In this manner the hot combustion gas produced by the primers 72 may travel into the interior of the ignitor cup 66. The quantity of the ignitor cup 66 is filled with a quantity of ignition material 74. This ignition material 74 may take any formulation known in the art, and is typically in granular or powder form. The ignition material 74 is retained within the ignitor cup 66 by an ignitor cap 76. The ignitor cap 76 is a thin metal sheet press fit within the sidewall 70 of the ignitor cup 66. The ignitor cap 76 is sufficiently strong to hold the ignition material 74 in position prior to activation. However, when the hot combustion gas from the primers 72 enter the ignitor cup 66, they cause combustion of the ignition material 74, which in turn produces hot ignition gas. The pressure of this gas is sufficient to rupture the ignitor cap 76.

The free end of the sidewall 70 of the ignitor cup 66 abuts against backstop 78. The backstop 78 is an annular disc, and may include a sidewall 80 extending from its peripheral edge. It is noted that the annular form of the backstop 78 requires that it have a central opening extending therethrough. A generant housing 82 is, in turn, connected to the backstop 78. While the connection could be by welding, with the spacer ring 40, slide ring 48, ignitor cup 66 and backstop 78 also connected to each other by various welds, a preferred arrangement eliminates these numerous welds.

Specifically, the generant housing 82 has the form of a concave member opening towards the piston 58, and includes a generally circular end face 84 and a peripheral wall 86 extending from the end face 84 to a free end 88. Much of the longitudinal length of the peripheral wall 86 is employed to define a housing interior 90, and as such the free end 88 could be secured to the backstop 78. However, the peripheral wall 86 may be lengthened to extend beyond this requirement, such that the free end 88 is located within the length of the spacer ring 40. As shown, the diameter of the peripheral wall 86, in the area between the sidewall 80 of the backstop 78 and free end 88, is sized to closely fit over the spacer ring 40, slide ring 48, ignitor cup 66 and backstop 78. The peripheral wall 86 is also provided with a reduced diameter abutment stop 92 at a position corresponding to the end of the sidewall 80 of the backstop 78. This will cause the sidewall 80 to abut against the abutment stop 92.

In this manner, the slide ring 48, ignitor cup 66 and backstop 78 may be clamped between the spacer ring 40 and abutment stop 92 in a tight arrangement. Welding or otherwise securing the free end 88 of peripheral wall 86 to the spacer ring 40 will then retain these elements in their proper positions, with only one weld required. It is noted that the free end 88 of the peripheral wall 86 is located between the second longitudinal end 44 of the spacer ring 40 and the flow ports 46, so that the flow ports 46 remain open.

The generant housing 82, as noted, defines the housing interior 90. Held within the housing interior 90 is a quantity of pyrotechnic gas generant material 94, hereafter referred to as generant. Various formulations for this generant are known in the art. As discussed above, some of these formulations produce an undesirable particulate which is sufficiently small that it is unfilterable. Others require the presence of reactive gas(es) to avoid the production of toxic gas. While these generant formulations could be used, it is preferred to employ a generant which does not produce particulates or toxic gas above trace levels. While less desirable, it is acceptable if the generant formulation does, however, produce particulates of a larger size which may be filtered. Produced solid matter of this size is often referred to as slag. While it is of course preferred that the generant formulation produce as little slag as possible, the present invention is directed toward removing this slag, and as such some slag production is acceptable.

This generant must, of course provide sufficient heat to raise the temperature (and thus the pressure) of the stored inflation gas 18. While not required, it is preferred that the generant will also produce a quantity of gas itself during its combustion, referred to as created inflation gas. It may be seen that the amount of stored inflation gas 18 required may be reduced if the generant 94 provides an appreciable quantity of created inflation gas. This will, in turn, permit the stored inflation gas 18 to be stored at a lower (and therefore less dangerous) pressure, or will permit the inflator 10 to be made smaller and lighter.

While known azide-type generant formulations could be employed, preferred non-azide formulations for the generant 94 are:

73.5% hexammine cobalt (III) trinitrate 21.5% copper (III) trihydroxynitrate (also known as basic copper nitrate)

5% guar gum or 40.3% copper (III) trihydroxynitrate (also known as basic copper nitrate)

38.2% hexammine cobalt (III) trinitrate 15.7% guanidine nitrate 5.7% guar gum

These formulations are preferably formed into small pellets. The preferred form for these pellets is short tubes, as shown, having dimensions such as 0.32 cm O.D.x0.11 cm I.D.x0.32 cm long. The pellets are placed in a jumbled configuration in the generant housing 82, as shown.

In the embodiment of FIG. 1 the generant 94 is held within the generant housing 82. More specifically, however, the generant 94 is held within a generant sleeve 96 mounted within the generant housing 82. The generant sleeve 96 is a cylindrical member having first and second ends 98 and 100, respectively. Generant sleeve 96 is formed of a porous material which will permit the created inflation gas to flow therethrough, but will provide at least some filtration of the created inflation gas. For example, a single layer of metal mesh of the type commonly used for pyrotechnic inflators could be employed, although expanded metal is preferred. Alternatively, a rigid foam could be employed, if sufficiently porous. The generant sleeve 96 has a diameter smaller than that of the peripheral wall 86, and to maintain the generant sleeve 96 in its proper, coaxial position there may be provided a locating member 102 on the end face 84.

The locating member 102 will engage the first end 98 of the generant sleeve 96 to hold it in position. In the embodiment shown, the locating member 102 engages the first end 98 on the inner face, about its entire periphery. A similar member could be provided at the second end 100 of the generant sleeve 96 to hold this second end in position, however, the abutment stop 92 may advantageously be formed with the proper inner diameter to position the second end 100. This will of course avoid the need for an additional component, reducing the cost of the inflator.

As noted above, the generant 94 is preferably in the form of pellets. To ensure that the pellets of generant 94 remain in the generant sleeve 96, and to prevent damage to the pellets from vibration, the pellets are pressed into position. Specifically, a plunger disc 104 is positioned at the second end 100 of the generant sleeve 96, in abutting relation with the generant 94. The plunger disc 104 is formed of perforated metal or other rugged material. Additionally, a biasing member 106, such as a wave spring, is mounted between the backstop 78 and plunger disc 104. As may be seen, the biasing member 106 will thus press the plunger disc 104 against the generant 94, maintaining the generant 94 within the generant sleeve 96 and preventing vibration damage.

It is also noted that the biasing member 106 will be formed to permit the flow of gas therethrough. In the embodiment shown, the wave spring is annular, and thus provides a central opening through which gas may flow. As noted above, the combustion of the ignition material 74 will rupture the ignitor cap 76, and flow outward. This ignition gas will flow through the central opening in the backstop 78 and biasing member 106, and will then flow through the perforations in the plunger disc 104. The hot ignition gas will then impinge upon the pellets of generant 94. This will in turn cause the combustion of the generant 94, producing the created inflation gas.

The created inflation gas will then flow out of the generant housing 82 to mix with the stored inflation gas 18. As noted above, the hot created gas will raise the temperature, and thus the pressure of the stored inflation gas 18. Additionally, the added volume of the created inflation gas will add to the volume of the stored inflation gas 18. The combined stored and created gas will then flow from the inflator 10 to fill the associated cushion (not shown). The specifics of the flow of the created gas through and from the generant housing 82 are an important part of the invention, and will be discussed in more detail below. The details of the flow from the inflator 10, and activation of the generant 94 will be discussed first.

In the embodiment shown, the pressure vessel 12 is sealed by the burst disc 38. While the increased pressure of the stored inflation gas 18 (due to heating by the created gas) could be used to rupture the burst disc 38, it is preferred to provide a mechanism for rupturing the disc prior to activation of the generant 94, to provide a more gradual pressure increase as discussed above.

In this embodiment, a projectile 108 is employed to rupture the burst disc 38. The projectile 108 is mounted outside of the pressure vessel 12, within a diffuser cap 110. The diffuser cap 110 is a concave member having its free edge secured to the mounting collar 30, preferably at the outer end 34. The diffuser cap 110 includes a plurality of exit ports 112 extending therethrough at angularly spaced locations about its sidewall. If desired, a diffusion screen 114 formed of perforated metal may be placed within the diffuser cap 110 (a portion of the diffusion screen 114 being cut away to better show the exit ports 112).

Mounted in the end of the diffuser cap 110, directly opposed to the burst disc 38, is an initiator 116. As is known in the art, the initiator 116 includes a terminal for connection to an appropriate controller (not shown) for activating the inflator 10. Upon receipt of a signal from the controller, the initiator 116 will rapidly combust to produce a quantity of gas. Mounted in surrounding relation to the initiator 116 is a barrel 118, which is coaxial with the longitudinal axis, and opens toward the burst disc 38. The projectile 108 is mounted within the barrel 118, interposed between the burst disc 38 and initiator 116. The outer periphery of the projectile 108 is in close contact with the barrel 118 (such as by the use of an 0-ring, as shown), such that the activation of the initiator 116 will cause the projectile 108 to be propelled from the barrel 118, toward, and through, the burst disc 38.

As may be envisioned, the projectile 108 will thus rupture the burst disc 38, permitting the stored inflation gas 18 to flow through the central opening 36 and exit ports 112, to the cushion (not shown). Additionally, the projectile 108 will continue to travel along the longitudinal axis to strike the head 60 of piston 58. The force of the projectile 108 against the piston 58 will be sufficient to rapidly move the piston from the inactive position shown in FIG. 1 to the striking position. As described above, this will cause an ignition train ultimately igniting the generant 94. The projectile 108 thus serves a dual function of releasing the stored inflation gas 18, and acting as a part of the activator 16 to begin operation of the heater assembly 14.

It is noted that the particular arrangement for releasing the stored inflation gas 18 and beginning operation of the heater assembly 14 may of course take other forms. For example, the burst disc 38 could be ruptured, and the generant ignition train started, by use of an arrangement similar to that shown in U.S. Pat. No. 5,538,278 to Blackshire et al., which is included herein by reference. Alternatively, the operation of the heater assembly 14 could be activated by an entirely separate initiator, such as shown in U.S. Pat. No. 5,351,988 to Bishop et al., which is included herein by reference. Further, the use of a burst disc to release the stored inflation gas 18 is not required, as this could be effected by an appropriate valve. As such, the particular arrangement for releasing the stored inflation gas 18 and beginning operation of the heater assembly 14 are not a critical part of this invention, and variation in these components is acceptable.

The present invention lies more particularly in the structure and operation of the generant housing 82. Specifically, the invention lies in arrangements to reduce the amount of pressure within the generant housing 82, and forcing tortuous gas flow paths, to reduce the amount of particulate which escapes the generant housing.

As noted above, the generant 94 is stored within the generant housing 82, such that the created inflation gas is produced within the generant housing 82. To permit this created inflation gas to exit the generant housing 82 and mix with the stored inflation gas, the generant housing 82 is provided with a plurality angularly spaced gas ports 120 extending through the end face 84. The general use of a gas port in the end face of the generant housing is of course known from the above-noted U.S. Pat. No. 5,230,531. The particular arrangement of the gas ports 120 of the present invention differ, however, from the single large port of that patent.

Specifically, in the embodiment of FIG. 1 it may be seen that the generant sleeve 96 is spaced inwardly with respect to the peripheral wall 86 of the generant housing 82, forming a free flow area 122 between the peripheral wall 86 and generant sleeve 96. In the embodiment shown, the free flow area 122 has a tubular shape, shown more clearly in FIG. 2. As noted above, the generant housing 82 also includes the locating member 102 which blocks the end of the generant sleeve 96 against flow of the created inflation gas in the longitudinal direction. As such, the gas ports 120 are located at positions on the end face 84 which communicate with the free flow area 122.

With this arrangement the created inflation gas will first flow radially outward through the generant sleeve 96 into the free flow area 122. The passage of the created inflation gas through the generant sleeve 96 will serve to filter the majority of the slag entrained with the created inflation gas.

Thereafter, the created inflation gas will turn to flow in the longitudinal direction. The turning of the gas will reduce its velocity, causing a portion of any remaining slag to be deposited upon the interior face of the peripheral wall 86. Finally, the created inflation gas will flow through the gas ports 120. Even in flowing through the gas ports 120, however, there is some change in direction for those portions of the created inflation gas which do not directly overlie one of the gas ports 120. As such, yet more of the slag will be deposited upon the interior side of the end face 84.

At this point the created inflation gas has had a large portion of the slag removed therefrom. The created inflation gas will still have a high velocity upon leaving the generant housing 82, and will impinge upon the end cap 28, where it is turned to flow toward the central opening 36. During this turning of the created inflation gas the majority of any remaining slag will then be deposited upon the inner face of the end cap 28.

From the above description, it may be seen that the arrangement of the generant housing 82 according to the present invention serves to remove slag entrained within the created inflation gas. Additionally, however, the arrangement of the generant housing 82 also serves to reduce the amount of slag which is initially entrained within the created inflation gas.

Specifically, the created inflation gas is formed within the generant sleeve 96, which greatly increases the pressure within the sleeve. This high pressure can serve to force (such as by extruding) small pieces of combusting generant 94 through the generant sleeve 96, to exit the generant housing 82. This increases the amount of particulate and undesirable gases in the created inflation gas. In the arrangement of the generant housing 82 according to the present invention, however, the pressure drop across the generant sleeve 96 is greatly reduced, such that a lesser amount of material is forced through the generant sleeve 96. This reduction in the pressure drop is achieved by the use of the generant sleeve 96 together with the free flow area 122. These combine to allow a large amount of flow area, reducing the pressure drop compared to a purely axial flow arrangement such as shown in the above noted U.S. Pat. No. 5,230,531.

The amount of pressure reduction required will of course depend upon numerous factors, such as the generant formulation, generant pellet shape, pressure within the stored inflation gas 18, the acceptable amount of particulate leaving the inflator, etc. A first important factor in achieving the reduced pressure drop is the porosity of the generant sleeve 96, since the gas must first flow through the generant sleeve 96 relatively easily. This conflicts, however, with the need to ensure that the generant sleeve 96 also filters the gas to remove entrained combusting generant and slag. To meet both needs, it is preferred that the generant sleeve 96 include numerous holes having a size between approximately 0.1–0.75 mm (0.004–0.030"). The number of holes is preferably chosen such that the generant sleeve 96 is between about 3–20% open. By this it is meant that the combined area of the holes is between 3–20% of the total outer surface area of the generant sleeve 96.

The amount of free flow area 122 is also important in reducing pressure drop, since it influences the pressure on the outer face of the generant sleeve 96. In general, it is believed that a free flow area 122 of between 3–30% of the total cross-sectional area of the peripheral wall 86 is acceptable. For the embodiment shown (with cylindrical elements), this may be expressed with reference to FIG. 2 as follows. The free flow area 122 is defined as the area formed by the peripheral wall 86 radius Rw (i.e., $\pi Rw^2$) minus the area formed by the generant sleeve 96 radius Rs (i.e., $\pi Rs^2$). The free flow area 122 so found should then be within 0.03–0.3 times the area formed by the peripheral wall radius Rw.

A further factor for reducing pressure drop is the size of the gas ports 120, since this influences the flow of gas from the free flow area 122. In this regard, it is preferred that the combined area of the gas ports 120 be between approximately 50–95% of the open area of the generant sleeve 96. Again, the particular size required will depend upon generant formulation, the amount of particulate which is considered acceptable, etc.

In this manner the arrangement of the generant housing 82 according to the present invention may provide greatly reduced particulate output from the inflator than prior art designs. This arrangement is, of course dependent upon the use of a generant 94 which forms slag rather than small (i.e., unfilterable) particulates. However, there are numerous such formulations of generants, and they find advantageous use in the present invention.

As a final note with regard to this first embodiment, it may be desirable to reinforce the end face 84 of the generant housing 82 to protect against deformation due to the pressure generated within the generant housing 82. To this end, the end face 84 may be formed with a series of angularly spaced depressions 124. The gas ports 120 may be located between these depressions 124, as shown. Additionally, it is preferred to provide a centrally located protrusion 126 in the end face 84. This protrusion 126 serves to reinforce the end face 84 in a manner similar to the depressions 124. Additionally, the protrusion 126 may serve to receive a similar mating protrusion formed in the locating member 102. This will serve to maintain the proper position of the locating member 102 on the end face 84, and thus maintain the proper free flow area 122.

With reference to FIGS. 3 and 4, an inflator according to a second embodiment of the present invention is generally designated by reference numeral 128. As the majority of the inflator is the same as that in FIG. 1, only the modified heater assembly is shown, and those elements common to the first embodiment employ identical reference numerals. While not fully shown, this inflator 128 will, however, include a pressure vessel having a sidewall 22, an arrangement to open the pressure vessel, and an arrangement to ignite the generant 94, as in the first embodiment. Also as with the first embodiment, arrangements other than those specifically shown may be employed for those functions.

With regard to the modified elements of this second embodiment, there is provided a generant housing 130 comprising an end face 132 and a peripheral wall 134 extending from the end face 132. The peripheral wall 134 may be secured to the arrangement for igniting the generant 94 by any appropriate means. The generant housing 130 will define an interior 136. Within this interior there is mounted a generant sleeve 96 of the type employed in the first embodiment, and including the first end 98 and second end 100. Also as with the first embodiment, the generant 94 is received within the generant sleeve 96, and is preferably biased as before, such as by plunger disc 104.

A locating member 138 is located at the first end 98 of the generant sleeve 96, and again includes a peripheral wall which may engage the first end 98. In this embodiment, however, the locating member 138 is not a gas impervious member, but includes numerous small exit ports 140 extending therethrough. Further, the end face 132 of the generant housing 130 includes one or more gas ports 142 which communicate both with the interior 20 of the pressure vessel 12, and with the exit ports 140. As such, in this embodiment the created inflation gas may flow thorough the exit ports 140, then through the gas ports 142 to reach the interior 20. This arrangement by itself is similar to that in the prior art. As such, with nothing more, this arrangement would suffer from the problem of too great a pressure within the generant housing 130, forcing a large quantity of slag to exit directly into the interior 20. While this created gas would impinge upon the inner face of the end cap (not shown in FIG. 3), an undesirable amount would still be retained in the flow of created inflation gas.

To avoid this problem, the generant housing 130 of the second embodiment of this invention further includes a plurality of longitudinally extending flow channels 144 formed in the peripheral wall 134. These flow channels are formed by angularly spaced protrusions in the peripheral wall 134, extending along a majority, and preferably the entirety, of the length of the generant sleeve 96. The portions of the generant housing 130 between these flow channels 144 may be deformed inward to abut the generant sleeve 96, thus assisting in maintaining the generant sleeve 96 in position. Each of these flow channels 144 serves to define a discrete free flow area 146 between the peripheral wall 134 and the generant sleeve 96. In a manner similar to the first embodiment, a portion of the created inflation gas may thus flow radially through the generant sleeve 96 to enter the discrete free flow areas 146, where it is turned to flow in the longitudinal direction. This serves to reduce slag in a manner similar to the first embodiment.

These flow channels 144 could extend to communicate with the gas port(s) 142 in the end face 132, such that this embodiment would function in a manner very similar to the first embodiment. Alternatively, each of the flow channels 144 may include at least one channel port 148 providing communication between the interior 20 of the pressure vessel 12 and the discrete free flow area 146. The portion of the created inflation gas which travels through the discrete free flow area 146 will thus pass through the associated channel port 148 to the interior 20. With this arrangement the pressure drop across the generant sleeve 96 is again reduced, preventing the formation of large quantities of slag, as in the first embodiment.

As such, in this embodiment a portion of the created inflation gas will flow directly through the exit ports 140 and gas ports 142, while another portion will flow through the generant sleeve 96, discrete free flow area 146 and channel port 148. With this arrangement there is less slag removal by impingement against the interior of the peripheral wall 134, since only a portion of the created inflation gas actually impinges against the peripheral wall 134. As such, the amount of slag removed is believed to be less with this embodiment, but it is still a viable arrangement for producing an inflator, since the majority of the slag is removed by generant sleeve 96.

The pressure drop is again an important factor in reducing slag in this embodiment. Here, however, there is the possibility of extruding the combusting generant through the locating member 138 as well as the generant sleeve 96. As in the previous embodiment, the percentage of open area in the generant sleeve 96 and the area of the channel ports 148 are again factors which affect the pressure drop. In a similar manner, the percentage of open area for the locating member 138 (i.e., the combined area of the exit ports 140 divided by the total surface area of the end of the locating member 138) and the area of the gas ports 142 also affect the pressure drop.

While the particular arrangement required will again depend upon the particular generant formulation, amount of particulate acceptable, etc., some general guidelines are as follows. It is preferred that the ratio of the open area in the generant sleeve 96 to the combined area of the channel ports 148 be approximately equal to the ratio of the open area in the locating member 138 to the combined area of the gas ports 142. Further, in a manner similar to the first embodiment, it is preferred that the combined area of the channel ports 148 be between approximately 50–95% of the open area of the generant sleeve 96, and that the combined area of the gas ports 142 be between approximately 50–95% of the open area of the locating member 138. Again, these values depend upon additional factors such as the formulation of the gas generant, the amount of particulate which is acceptable, etc.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In a hybrid inflator including a pressure vessel holding a quantity of stored gas, and a quantity of gas generant operatively associated with said stored gas, the improvement comprising:
    a generant housing having an end face and a peripheral wall defining an interior, and at least one gas port extending through said end face;
    a generant sleeve received within said interior in spaced opposed relation to said peripheral wall to define a free flow area between said generant sleeve and said peripheral wall, said at least one gas port communicating with said free flow area, said generant sleeve being porous;
    said quantity of gas generant being received within said generant sleeve in said interior, said gas generant producing, upon activation, a quantity of created inflation gas which flows through said generant sleeve to said free flow area, impinges upon said peripheral wall, and is thereby deflected to flow through said free flow area to, and through, said at least one gas port.

2. An inflator as in claim 1, wherein said generant housing is located within said pressure vessel.

3. An inflator as in claim 1, wherein said peripheral wall and said generant sleeve take the general form of tubes, and said generant sleeve is located coaxially within said peripheral wall, such that said free flow area is generally tubular.

4. An inflator as in claim 3, wherein said generant sleeve is formed of a metal mesh.

5. An inflator as in claim 3, wherein said at least one gas port comprises a plurality of angularly spaced gas ports.

6. An inflator as in claim 5, wherein said end face includes a plurality of radially extending depressions providing increased strength.

7. An inflator as in claim 6, wherein said gas ports are located between said depressions.

8. An inflator as in claim 1, wherein, in a plane normal to a longitudinal axis of said peripheral wall, said peripheral wall defines a cross-sectional area, and said free flow area defines a cross-sectional area, said cross-sectional area of said free flow area being 3–30% of the cross-sectional area of said peripheral wall.

9. An inflator as in claim 8, wherein said generant housing is located within said pressure vessel.

10. An inflator as in claim 8, wherein said peripheral wall and said generant sleeve take the general form of tubes, and said generant sleeve is located coaxially within said peripheral wall, such that said free flow area is generally tubular.

11. An inflator as in claim 10, wherein said generant sleeve is formed of a metal mesh.

12. An inflator as in claim 10, wherein said at least one gas port comprises a plurality of angularly spaced gas ports.

13. An inflator as in claim 12, wherein said end face includes a plurality of radially extending depressions providing increased strength.

14. An inflator as in claim 13, wherein said gas ports are located between said depressions.

* * * * *